(12) United States Patent
Nishiura et al.

(10) Patent No.: US 9,039,093 B2
(45) Date of Patent: May 26, 2015

(54) VEHICLE SEAT HAVING FRAME MEMBER

(71) Applicant: TOYOTA BOSHOKU KABUSHIKI KAISHA, Aichi-ken (JP)

(72) Inventors: Takeshi Nishiura, Aichi-ken (JP); Tatsuya Karaki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 47 days.

(21) Appl. No.: 13/783,653

(22) Filed: Mar. 4, 2013

(65) Prior Publication Data

US 2013/0257131 A1 Oct. 3, 2013

(30) Foreign Application Priority Data

Mar. 29, 2012 (JP) ................................. 2012-076738
Feb. 20, 2013 (JP) ................................. 2013-030752

(51) Int. Cl.
| | | |
|---|---|---|
| *B60N 2/44* | (2006.01) | |
| *B60N 2/42* | (2006.01) | |
| *B60N 2/68* | (2006.01) | |

(52) U.S. Cl.
CPC ................ *B60N 2/68* (2013.01); *B60N 2/4228* (2013.01); *B60N 2/4221* (2013.01)

(58) Field of Classification Search
CPC ........ B60N 2/68; B60N 2/686; B60N 2/4222; B60N 2/4228
USPC .............................. 297/452.18, 452.1, 216.13
See application file for complete search history.

(56) References Cited

U.S. PATENT DOCUMENTS

| | | | |
|---|---|---|---|
| 4,832,408 A | | 5/1989 | Bertsch et al. |
| 6,059,369 A | * | 5/2000 | Bateson et al. .......... 297/452.18 |
| 8,523,284 B2 | * | 9/2013 | Yamada et al. .......... 297/452.18 |
| 2009/0108661 A1 | * | 4/2009 | Ishijima et al. ............ 297/452.1 |
| 2011/0006580 A1 | * | 1/2011 | Ishimoto et al. ......... 297/452.18 |
| 2014/0139004 A1 | * | 5/2014 | Matsumoto et al. ..... 297/452.18 |
| 2014/0159462 A1 | * | 6/2014 | Matsumoto et al. ..... 297/452.18 |

FOREIGN PATENT DOCUMENTS

| | | |
|---|---|---|
| DE | 42 08 150 | 9/1993 |
| DE | 197 57 060 | 6/1999 |
| DE | 198 27 563 | 12/1999 |
| JP | 2005/103002 | 4/2005 |
| JP | 2013230787 A * | 11/2013 |
| JP | 2013230788 A * | 11/2013 |
| JP | 2013256146 A * | 12/2013 |
| WO | 2008/019981 | 2/2008 |

* cited by examiner

*Primary Examiner* — Milton Nelson, Jr.
(74) *Attorney, Agent, or Firm* — Greenblum & Bernstein, P.L.C.

(57) ABSTRACT

Embodiments of the present invention include a vehicle seat having a frame member and a reinforcing member for reinforcing the frame member. The frame member has an elongated portion. The elongated portion is formed of resin and preferably has a flat-plate-like or bar-like configuration. The elongated portion includes a first portion, a front second portion and a rear second portion. The first portion may be arranged in a longitudinal manner with respect to the vehicle seat and extends vertically. The front second portion extends in the lateral direction of the vehicle seat from a front end of the first portion. The rear second portion extends in the lateral direction of the vehicle seat from a rear end of the first portion. The elongated portion is configured so that a neutral axis is positioned between the front and rear second portions.

18 Claims, 10 Drawing Sheets

US 9,039,093 B2

VEHICLE SEAT HAVING FRAME MEMBER

This application claims priority to Japanese patent applications serial numbers 2012-76738 and 2013-30752, the contents of which are incorporated herein by reference.

BACKGROUND OF THE INVENTION

1. Field of the Invention

Embodiments of the present invention relate to vehicle seats.

2. Description of the Related Art

Japanese Laid-Open Patent Application No. 2005-103002 discloses a seatback of a vehicle seat. The seatback includes a frame member having a metal body frame and a resin body frame. The metal body frame is substantially of a rectangular configuration as viewed from the front. The metal body frame constitutes a framework of the seatback and an opening at its center. The metal body frame is formed of a tubular steel pipe having, for example, a circular cross-section.

The resin body frame is arranged at the center opening of the metal body frame. The resin body frame includes a hollow flat plate and a plurality of ribs. The plurality of ribs is provided in the hollow flat plate. The ribs protrude from an inner surface to an outer surface of the hollow flat plate. The ribs are arranged side by side and in the vertical direction at appropriate intervals. Due to its hollowness, the resin body frame is reduced in weight while maintaining rigidity due to the plurality of ribs. Thereby, the frame member has been reduced in weight for the purpose of achieving a reduction in vehicle weight, etc.

International Publication WO 2008/019981 A1 discloses a frame having left and right elongated portions extending vertically. One of the elongated portions has a composite member composed from a composite material having fibers. There is also a rib for reinforcing the composite member. The composite member has a body plate facing a lateral side of the seat, a front flange provided at a front end of the body plate, and a rear flange provided at a rear end of the body plate. The rib is formed from thermoplastic material and has a lattice-like configuration. The rib is disposed between the front and rear flanges and is bonded on the body plate.

However, there has been a demand for a frame member which can be efficiently reduced in weight while exhibiting sufficient rigidity.

SUMMARY OF THE INVENTION

Certain embodiments of the present invention include a vehicle seat having a frame member and a reinforcing member for reinforcing the frame member. The frame member has an elongated portion. The elongated portion may be formed of resin and have a flat-plate-like or bar-like configuration. The elongated portion may include a first portion, a front second portion and a rear second portion. The first portion may extend vertically and faces a lateral side of the seat. The front second portion may extend in the width direction of the vehicle seat from a front end of the first portion. The rear second portion may extend in the width direction of the vehicle seat from a rear end of the first portion. The elongated portion may be configured so that a neutral axis is positioned between the front and rear second portions. The neutral axis preferably remains unaffected by tensile or compressive forces when a force is applied to the seat from the front to the rear. The reinforcing member is preferably not provided on the first portion but rather provided on a surface of the front and/or rear second portion. The reinforcing member has a plurality of elongated fibers oriented in the longitudinal direction of the elongated portion.

The vehicle seat may receive a large force from front to rear when the vehicle is bumped. The force is applied on the elongated portion of the frame member as bending stress. The front second portion typically receives tensile force. The rear second portion typically receives compressive force. The reinforcing member is provided on the surface of the front or/and rear second portion. Thus, the reinforcing member may effectively reinforce the elongated portion. Additionally the reinforcing member has elongated fibers oriented in the same direction as the direction of the tensile or compressive force. Thus, the reinforcing member may effectively neutralize the tensile or compressive force.

On the other hand, the reinforcing member is not provided on the first portion. In this way, the overall cost of the frame member may be reduced as reinforcing members can be expensive. When the elongated portion receives the bending stress, the force applied on the first portion is smaller than the force applied on the front and rear second portions. Thus, the elongated portion may have enough strength to provide support even if the reinforcing member is not provided on the first portion.

DETAILED DESCRIPTION OF THE INVENTION

Each of the additional features and teachings disclosed above and below may be utilized separately or in conjunction with other features and teachings to provide improved vehicle seats. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
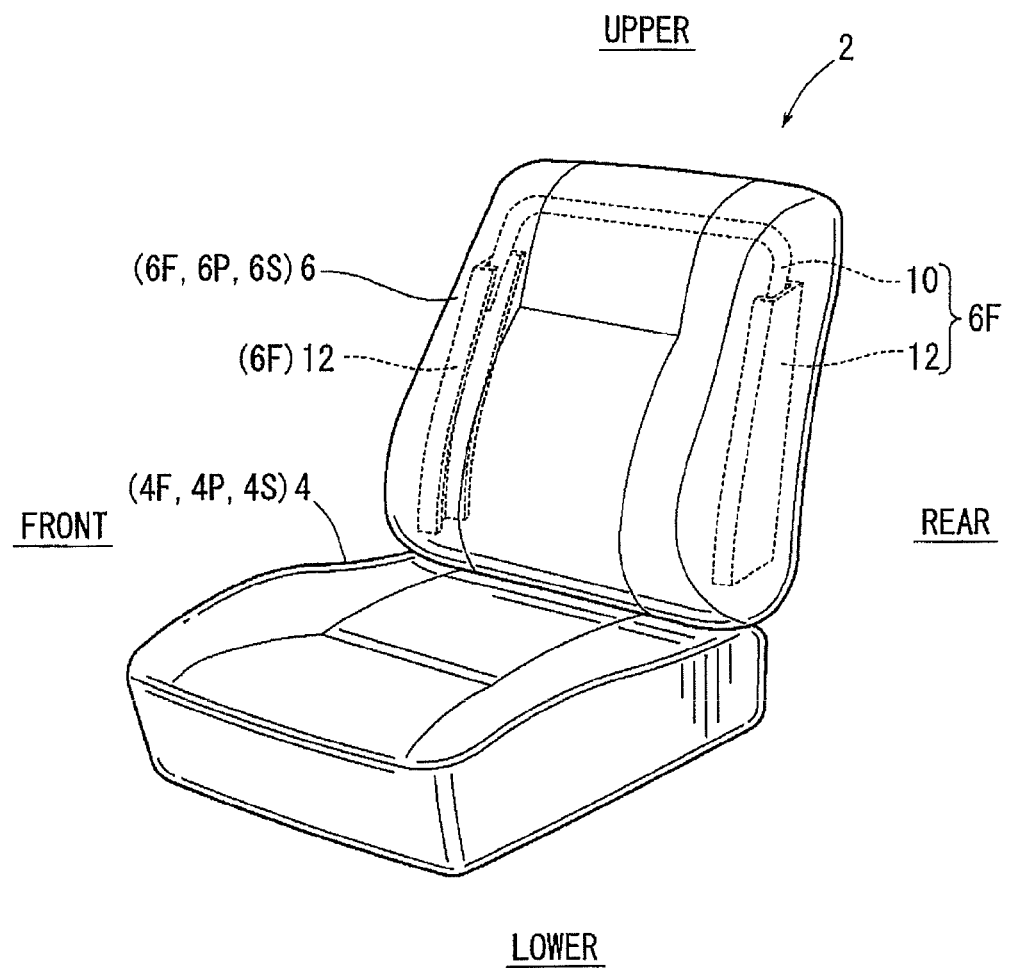
FIG. 1 is a perspective view of a vehicle seat.

An embodiment of the present invention will be described with reference to FIGS. 1 to 5C. As shown in FIG. 1, a vehicle seat 2 has a seat cushion 4 and a seatback 6 as seat component members. The seat component members respectively have frame members 4F and 6F, cushion members 4P and 6P, and covers 4S and 6S. The cushion members 4P and 6P form the seat contour while the covers 4S and 6S cover the cushion members 4P and 6P, respectively.

As shown in FIG. 1, the seatback 6 is rotatably connected to the seat cushion 4, and can be erected and tilted. When an impact occurs, for example, during a vehicle collision or the like, the frame member 6F in the erect state typically receives a bending stress so as to cause warping of the frame member 6F. The frame member 6F is of an arcuate configuration in conformity with the seat contour. The frame member 6F has an upper frame 10 and a pair of side frames 12.

As shown in FIG. 1, the upper frame 1 is of a bar-like configuration, and is situated in an upper portion of the seat 2. The upper frame 10 is substantially of a reverse-U-shaped configuration as viewed from the front. The side frames 12 are of a flat-plate-like configuration and situated on side portions of the seat 2. The side frames 12 are fixed to a lower end portion of the upper frame 10. The pair of side frames 12 can be formed of a resin such as polyethylene (PE) or polypropylene (PP). As a result, the side frames 12 may be reduced in weight.

Figure 2:
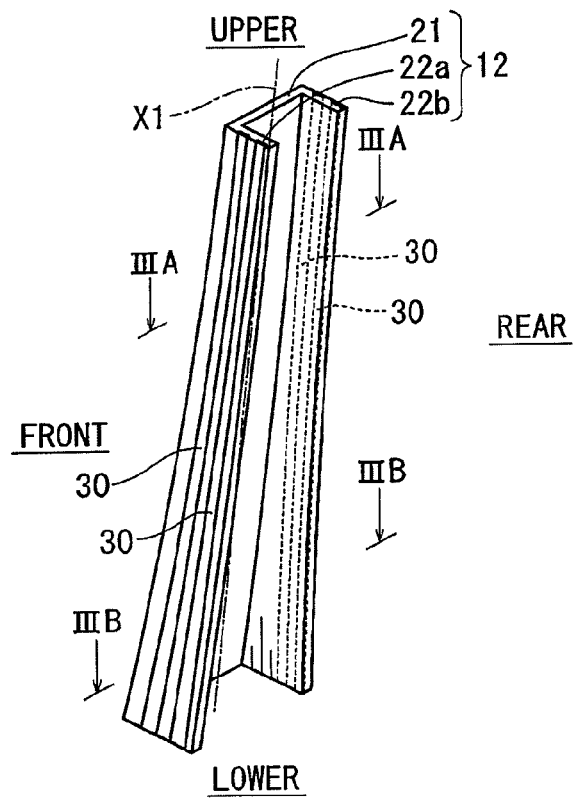
FIG. 2 is a perspective view of a part of a frame member.
Figures 3A, 3B:
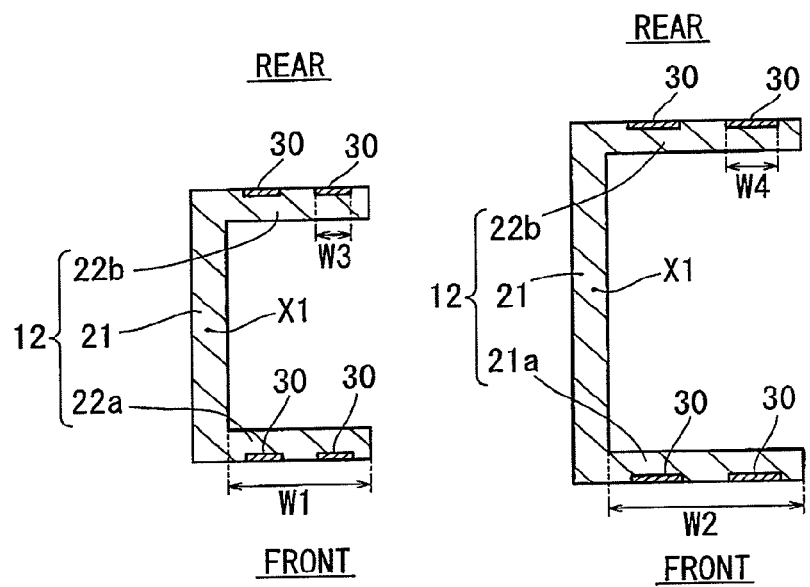
FIG. 3A is a cross-sectional view taken along line IIIA-IIIA in FIG. 2.
FIG. 3B is a cross-sectional view taken along line IIIB-IIIB in FIG. 2.

As shown in FIGS. 2, 3A, and 3B, each side frame 12 includes a flat plate of a substantially U-shaped cross-sectional configuration. The side frame 12 has a first portion 21, a pair of second portions 22a and 22b, and a reinforcing member 30. The first portion 21 is a flat-plate-like configuration. In the state in which the seatback 6 is upright, the first portion 21 extends vertically and faces a lateral side of the seatback 6. The first portion 21 includes a neutral axis X1. The neutral axis X1 has a neutral portion, which receives little or no bending stress from the impact of a collision.

As shown in FIGS. 2, 3A, and 3B, the front second portion 22a is located on a front end of the first portion 21. The rear second portion 22b is located on a rear end of the first portion 21. The second portions 22a and 22b extend in the seat width direction and exhibit a flat-plate-like configuration. The second portions 22a and 22b face the front or rear. The front second portion 22a is formed so as to be bent toward the interior of the seat from the front end of the first portion 21. The rear second portion 22b is formed so as to be bent toward the interior of the seat from the rear end of the first portion 21. The first portion 21 is situated between the front second portion 22a and the rear second portion 22b. The front second portion 22a and the rear second portion 22b are substantially of the same configuration and opposite each other.

As shown in FIG. 2, each of the second portions 22a and 22b gradually increase in width as they extend downward from above. As shown in FIGS. 3A and 3B, each of the second portions 22a and 22b has an upper portion of a small width dimension W1, and a lower portion of a large width dimension W2. As compared with the upper portion, the lower portion of each of the second portions 22a and 22b typically receives a larger stress at the time of collision. In this regard, the lower portion has a larger width and exhibits higher rigidity than the upper portion.

Figure 4:
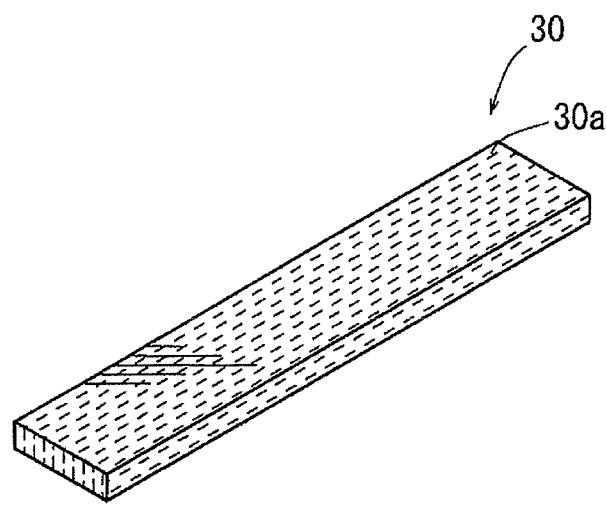
FIG. 4 is a perspective view of a reinforcing member.

As shown in FIG. 4, each reinforcing member 30 is formed as a strip and is typically of a sheet-like configuration. The reinforcing member 30 includes a plurality of elongated fibers 30a. As shown in FIGS. 2, 3A, and 3B, the reinforcing members 30 can be provided on the second portions 22a and 22b of each side frame 12.

The reinforcing member 30 is formed, for example, of polyester, polyethylene, polypropylene, polystyrene, polyimide, polyvinyl alcohol, polyvinyl chloride, nylon, or cellulose.

The elongated fibers 30a include, for example, one or a combination of the following fibers: carbon fibers, glass fibers, boron fibers, aramid fibers, silicon carbide fibers, alumina fibers, and metal fibers. The length of the elongated fibers 30a is typically 100 mm or less, and, more preferably, 20 to 60 mm. The thickness or diameter of the elongated fibers 30a is typically 50 µm or less, and, more preferably, 10 to 15 µm. The content of the elongated fibers 30a in the reinforcing member 30 is typically 10 to 90% by weight.

As shown in FIG. 4, the elongated fibers 30a are arranged so as to extend in the longitudinal direction of the reinforcing member 30. The elongated fibers 30a can be arranged on the surface and/or in the interior of the reinforcing member 30.

A pair of reinforcing members 30 is attached to each of the second portions 22a and 22b of the side frame 12. The reinforcing members 30 extend in the vertical direction, and are installed in parallel in the width direction of the seat. The orientation of the reinforcing members 30 with respect to the second portions 22a and 22b can be determined such that the elongated fibers 30a extend in the longitudinal direction of the second portions 22a and 22b.

Like the width of the side frame 12, the width of the reinforcing members 30 increases gradually as they extend downward from above. Each reinforcing member 30 has an upper portion of a small width dimension W3 and a lower portion of a large width dimension W4.

There are no particular limitations regarding the method of attaching the reinforcing members 30 to each side frame 12. For example, it is possible to attach the reinforcing members 30 to the side frame 12 after the forming of the same, or to integrate the reinforcing members 30 with the side frame 12 at the time of forming of the same.

Figure 5C:
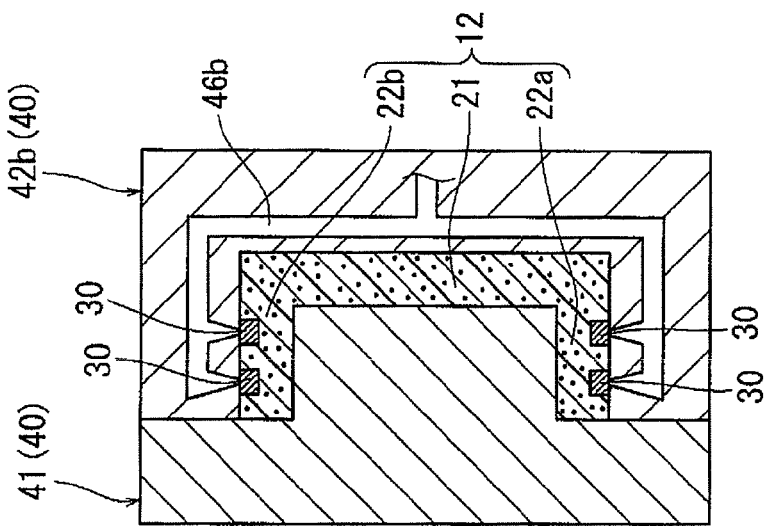
FIG. 5C is a cross-sectional view of the movable mold, a second stationary mold and the frame member for showing a manufacturing step of the frame member.
Figure 5B:
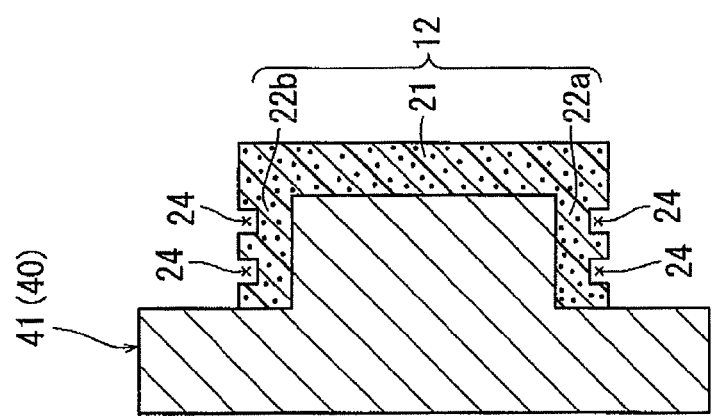
FIG. 5B is a cross-sectional view of the movable mold and the frame member for showing a manufacturing step of the frame member.
Figure 5A:
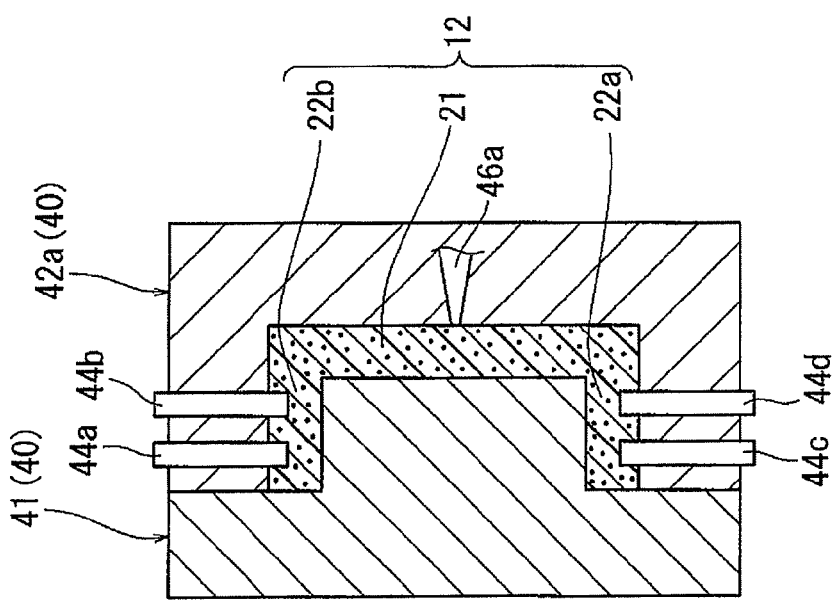
FIG. 5A is a cross-sectional view of a movable mold, a first stationary mold and the frame member for showing a manufacturing step of the frame member.

As shown in FIGS. 5A, 5B, and 5C, the side frame 12 and the reinforcing members 30 are integrated with each other by a molding apparatus 40. The molding apparatus 40 has a movable mold 41, a first stationary mold 42a, and a second stationary mold 42b. The first stationary mold 42a and the second stationary mold 42b are of a configuration allowing closing on the movable mold 41. A cavity in conformity with the configuration of the side frame 12 is provided between the first stationary mold 42a and the movable mold 41. Another cavity in conformity with the configuration of the side frame 12 is also provided between the second stationary mold 42b and the movable mold 41. The cavities has the same figures marked by dotted areas in FIGS. 5A, 5B and 5C.

When the first stationary mold 42a and the movable mold 41 are closed together, a plurality of slide pins 44a to 44d are installed inside the first stationary mold 42a. The tip end portions of the slide pins 44a to 44d are of a configuration corresponding to that of the reinforcing members 30.

The tip end portions of the slide pins 44a to 44d protrude into the cavity, and the tip end portions are set at positions where the reinforcing members 30 are to be provided. Molten resin is injected into the cavity from a first gate 46a of the first stationary mold 42a, thereby molding the side frame 12. The slide pins 44a to 44d are extracted from the first stationary mold 42a. As a result, a plurality of recessed portions 24 are formed in the side frame 12 by the tip end portions of the slide pins 44a to 44d.

The movable mold 41 is extracted from the first stationary mold 42a together with the side frame 12. After this, the movable mold 41 and the second stationary mold 42b are closed together. The second stationary mold 42b has a second gate 46b having a branching-off configuration. The second gate 42b has a plurality of injection ports respectively open to the recessed portions 24 of the side frame 12. The molding material (molten resin) and the elongated fibers 30a of the reinforcing members 30 are poured into the recessed portions 24 from the second gate 46b. As a result, the reinforcing members 30 are molded. The molding material and the elongated fibers 30a flow in the longitudinal direction of the reinforcing members 30. Thus, the elongated fibers 30a are oriented in the longitudinal direction of the reinforcing members 30 when the molding material is poured in. In this way, the reinforcing members 30 and the side frame 12 can be integrated with each other when the side frame 12 is molded.

The reinforcing members 30 can be formed in any desired configuration, dimension, etc. relatively easily by the molding apparatus 40. For example, as shown in FIGS. 2, 3A and 3B, the width dimension W4 of the lower portion of each reinforcing member 30 is larger than the width dimension W3 of the upper portion thereof.

When the vehicle undergoes collision with the seatback 6 is in the erect state, an impact is applied to the frame member 6F. Due to the impact, the frame member 6F receives a force tending to warp it. As shown in FIG. 2, the front second portion 22a is situated on the front side of the neutral axis X1, and receives a tensile stress. The rear second portion 22b is situated on the rear side of the neutral axis X1, and receives a compressive stress.

Each of the second portions 22a and 22b is provided with a pair of reinforcing members 30. The reinforcing members 30 of the front second portion 22a receive the tensile stress applied to the front second portion 22a. For example, the plurality of elongated fibers 30a resists the tensile stress. As a result, the tensile stress applied to the front second portion 22a is relieved. The reinforcing members 30 of the rear second portion 22b receive a compressive stress applied to the rear second portion 22b. For example, the plurality of elongated fibers 30a resists the compressive stress. As a result, the compressive stress applied to the rear second portion 22b is relieved. Thus, it is possible to restrict the bending of the side frame 12.

As described above, each side frame 12 is formed of resin. The reinforcing members 30, which excel in rigidity, are preferably provided solely on the second portions 22a and 22b for receiving tensile stress or compressive stress. As a result, the frame member 6F can have sufficient rigidity and be efficiently reduced in weight.

The reinforcing members 30 have a configuration in conformity with the side frames 12. Thus, the reinforcing members 30 can be easily attached to the side frames 12. The lower portions of the side frames 12 are the portions typically receiving large stress when an impact is applied to the side frames 12. The lower portions of the side frames 12 exhibit a larger width as compared with the upper portion thereof. Thus, the side frames 12 are efficiently enhanced in rigidity.

As shown in FIG. 1, the vehicle seat 2 has the frame member 6F and the strip-like reinforcing members 30. The frame member 6F has elongated portions extending along the seat contour (e.g., the side frames 12). The portions are formed of resin and are of a flat-plate-like or a bar-like configuration. Each of the portions preferably has a first portion 21 having the neutral axis X1 and second portions 22a and 22b lacking the neutral axis X1. The reinforcing members 30 include a plurality of elongated fibers 30a, and are attached to the second portions 22a and 22b. The elongated fibers 30a are oriented in the longitudinal direction of the second portions 22a and 22b.

Thus, the frame member 6F, which is formed of resin, may be lighter than a frame member formed of metal. When an impact generated at the time of vehicle collision is applied, a bending stress is applied to the frame member 6F tending to cause warping. In particular, the second portions 22a and 22b receive a tensile stress or a compressive stress. The reinforcing members 30 are provided solely on the second portions 22a and 22b. Accordingly, the reinforcing members 30 may effectively improve the frame member 6F in terms of rigidity. At the same time, a lightweight frame member 6F can be created.

The second portions 22a and 22b have a width gradually changing in size in the longitudinal direction of the frame member 6F. The reinforcing members 30 have a width gradually changing in size in correspondence with the width of the second portions 22a and 22b.

Thus, due to the reinforcing members 30, it is possible to efficiently enhance the rigidity of the frame member 6F in conformity with the configuration of the frame member 6F.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

The frame member 6F may have the configuration or size as mentioned above or some other configuration or size. As shown in FIGS. 3A and 3B, the frame member 6F may have a substantially U-shaped cross-sectional configuration. Other embodiments may have cross-sections which are substantially I-shaped, circular shaped, bar-like shaped, rectangular shaped or polygonal shaped. The frame member 6F may have a configuration obtained by substantially U-shaped members connected to each other, etc. The frame member 6F may be of a symmetrical configuration with the neutral axis in-between, or of a non-symmetrical configuration. When the frame member 6F is not of a symmetrical configuration, the first portion and the second portion thereof can be determined according to the position of the neutral axis.

The reinforcing members 30 may be provided on the side frames 12 as shown in FIG. 2; instead, the reinforcing members 30 may be provided on the upper frame 10.

The reinforcing members 30 may have the configuration and size as mentioned above, or some other configuration and size. It is also possible to provide a reinforcing member 30 on the front second portion 22a and/or the rear second portion 22b. Alternately, it is also possible to provide two or more reinforcing members on each of the second portions. Finally, it is also possible to provide the reinforcing members solely on one of the front second portion 22a or the rear second portion 22b.

As described above, each of the second portions 22a and 22b may have an upper portion and a lower portion of a configuration corresponding to the shapes of the reinforcing members 30. Alternately, the second portions 22a and 22b may be of some other configuration not corresponding to the shapes of the reinforcing members 30.

As shown in FIG. 2, it is possible to provide first reinforcing members extending in the longitudinal direction of the second portions 22a and 22b. Alternatively, it is also possible to provide second reinforcing members extending in the width direction of the second portions 22 and 22b in addition to or instead of the first reinforcing members.

The elongated fibers 30a may be oriented in the longitudinal direction of the reinforcing members 30 as shown in FIG. 4, or be oriented in some other direction. For example, they may be inclined with respect to the longitudinal direction of the reinforcing members 30.

The plurality of elongated fibers 30a may all extend in the same direction as shown in FIG. 4, or the elongated fibers may extend in different directions each other. The elongated fibers 30a may extend straight as shown in FIG. 4, or may be curved.

The reinforcing members 30 may be provided on the frame member 6F of the seatback 6, as described above, or on the frame member 4F of the seat cushion 4, etc.

As described above, the reinforcing members 30 may be integrated with the side frames 12 at the time of molding of the side frames 12. Alternatively, the reinforcing members 30 may be attached to the side frames 12 after the molding of the side frames 12.

The frame member 6F may be formed partially in a flat-plate-like or a bar-like configuration, or entirely in a flat-plate-like or a bar-like configuration.

Figure 6:
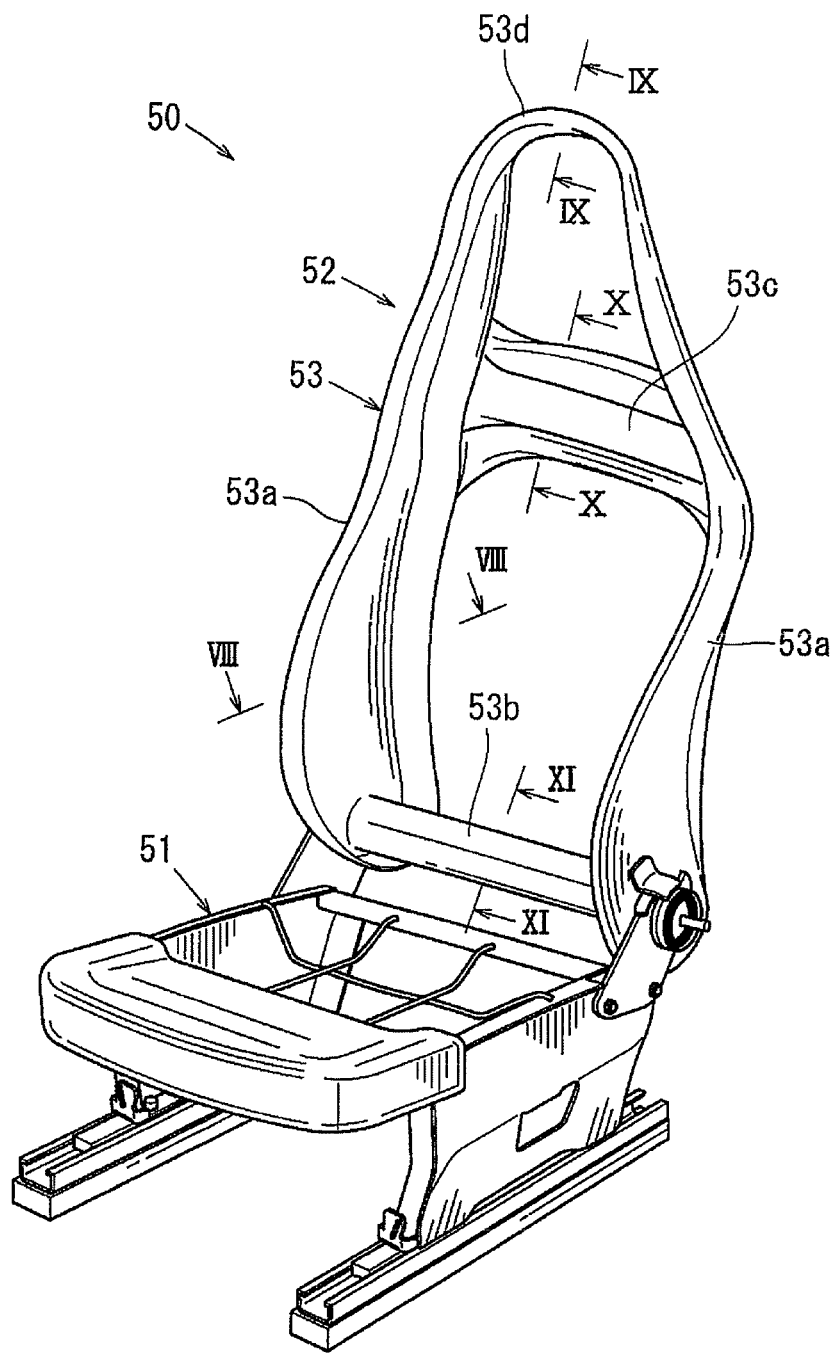
FIG. 6 is a perspective view of a frame structure of another vehicle seat.
Figure 7:
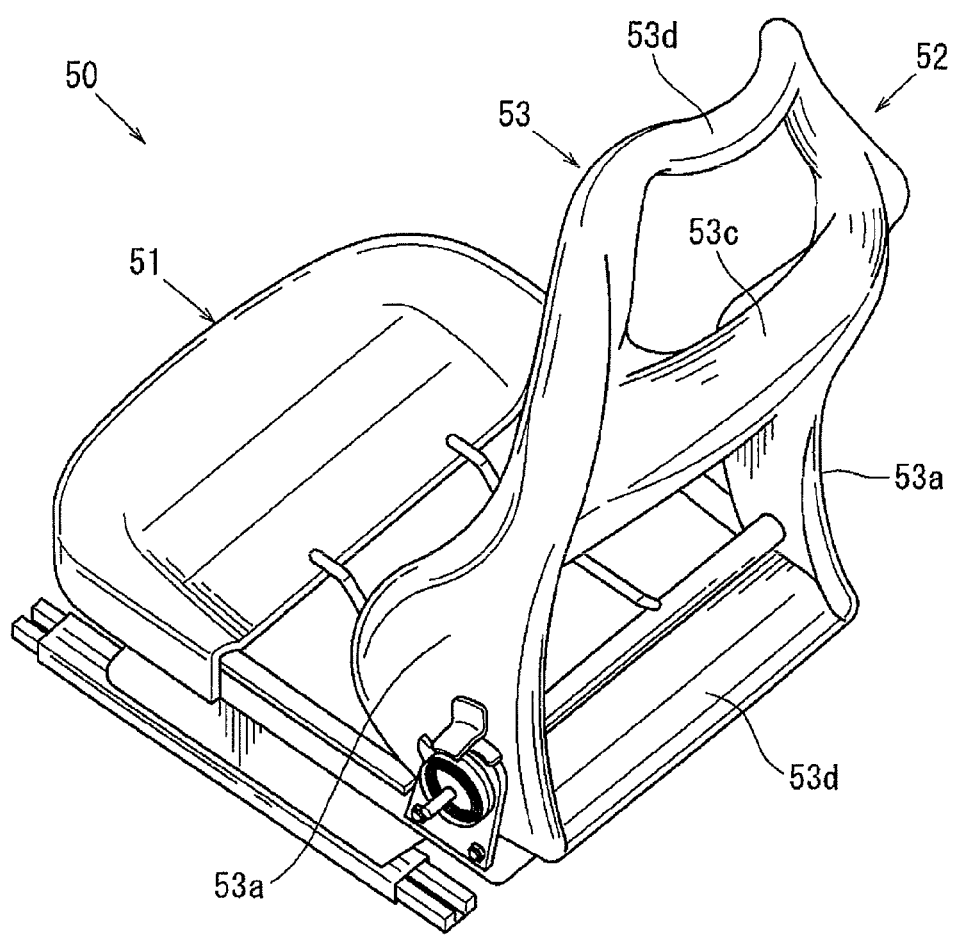
FIG. 7 is a perspective view of the frame structure of FIG. 6 from above.

The vehicle seat may have a structure shown in FIGS. 6 to 11 instead of the structure described above. As shown in FIGS. 6 and 7, the vehicle seat has a seat cushion and a seatback. The seat cushion has a frame structure 51 including a plurality of metal members. The seatback has a frame structure 52 including a resin frame member 53.

As shown in FIGS. 8 to 11, the frame structure 52 comprises the frame member 53 and reinforcing members 48, 49, 55 to 60 for reinforcing the frame member 53. As shown in FIG. 6, the frame member 53 has a flat-plate-like configuration and includes left and right elongated portions 53a, upper connecting portion 53d and connecting portions 53b and 53c. The elongated portions 53a have flat-plate-like configurations extending vertically and facing in a width direction. The upper connecting portion 53d extends upward from upper ends of the left and right elongated portions to connect the left and right elongated portions. The connecting portions 53b extends horizontally from lower portions of the left and right elongated portions to connect the left and right elongated portions. The connecting portions 53c extend horizontally from upper portions of the left and right elongated portions to connect the left and right elongated portions.

Figure 8:
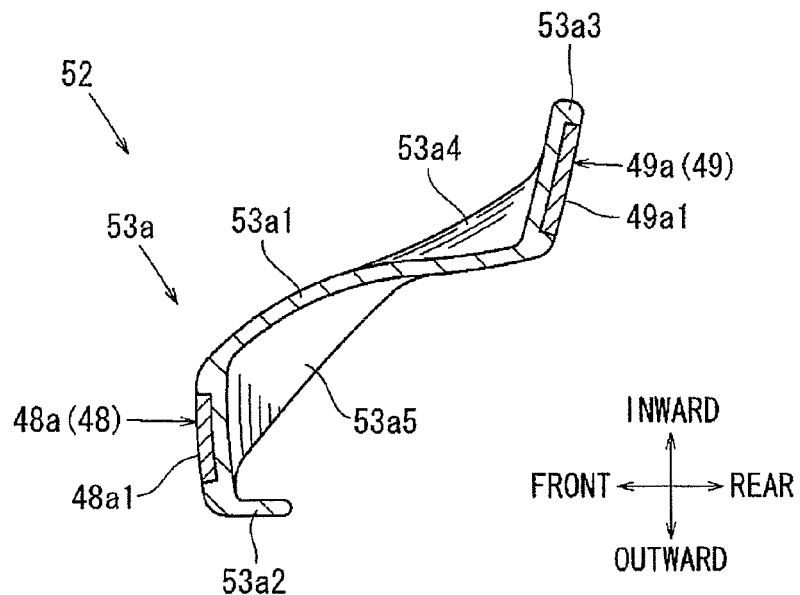
FIG. 8 is a cross-sectional view taken along line VIII-VIII in FIG. 6.

As shown in FIG. 8, each of the elongated portions 53a has a first portion 53a1, a front second portion 53a2, a rear second portion 53a3, and ribs 53a4 and 53a5. The first portion 53a1 has a flat-plate-like configuration extending in a front-rear direction and facing in the width direction. The front second position 53a2 extends outward (in the width direction) from a front end of the first portion 53a1. The rear second position 53a3 extends inward (in the width direction) from a rear end of the first portion 53a1. The rib 53a5 spreads horizontally to connect the first portion 53a1 and the front second portion 53a2. The rib 53a4 spreads horizontally to connect the first portion 53a1 and the rear second portion 53a3.

As shown in FIG. 8, a portion 48a of the reinforcing member 48 is provided in a front area (on a surface) of the front second portion 53a2. The portion 48a extends in a longitudinal direction of the elongated portion 53a and includes fibers oriented in the longitudinal direction. The portion 48a is partially enclosed by the front second member 53a2. Both sides of the portion 48a are covered by the front second portion 53a2 in the width direction. A rear face of the portion 48a is covered by the front second portion 53a2 from rear. A front face of the portion 48a is not covered by the front second portion 53a2 so that it is exposed to front. A portion 49a of the reinforcing member 49 is provided in a rear area (on a surface) of the rear second portion 53a3. The portion 49a is partially enclosed by the rear second member 53a3. Both sides and a front face of the portion 49a are covered by the rear second portion 53a3. A rear face of the portion 49a is exposed to the rear.

Figure 9:
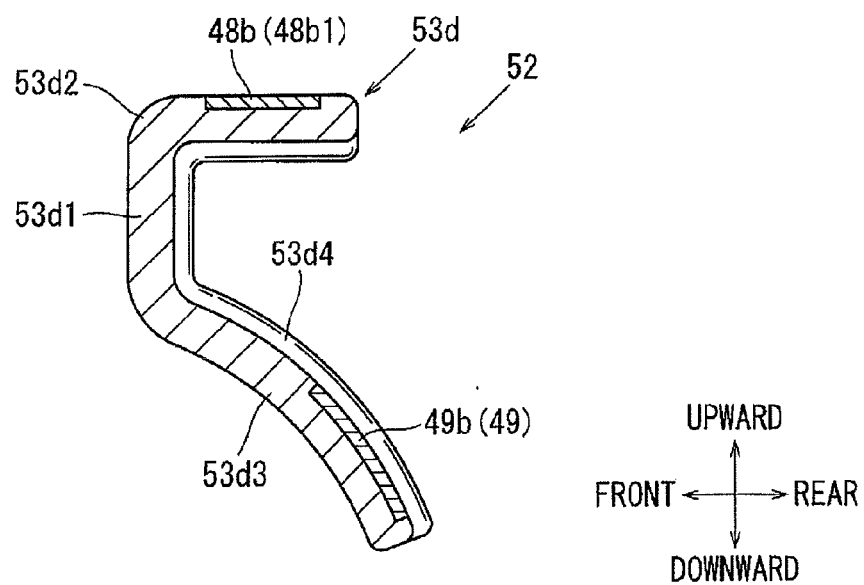
FIG. 9 is a cross-sectional view taken along line IX-IX in FIG. 6.

As shown in FIG. 9, the upper connecting portion 53d has integrally a main portion 53d1, upper portion 53d2, lower portion 53d3 and a rib 53d4. The main portion 53d1 extends upward from the first portion 53a1 of the elongated portion 53a to face in a front-rear direction. The upper portion 53d2 extends upward from the front second portions 53a2 of the elongated portion 53a. The upper portion 53d2 extends rearward from an upper area of the main portion 53d1. The lower portion 53d3 extends from upper areas of the rear second portions 53a3 of the elongated portion 53a. The lower portion 53d3 extends rearward and downward from a lower end of the main portion 53d1. The rib 53d4 extends in a vertical plane to connect the main portion 53d1, the upper portion 53d2 and the lower portion 53d3.

As shown in FIG. 9, a portion 48b of the reinforcing member 48 is provided in an upper area of the upper portion 53d2. The portion 48b extends in a longitudinal direction of the upper portion 53d2. The portion 48b is partially enclosed by the upper portion 53d2. A portion 49b of the reinforcing member 49 is provided in a rear area of the lower portion 53d3. The portion 49b extends in a longitudinal direction of the lower portion 53d3. The portion 49b is partially enclosed by the lower portion 53d3.

Figure 10:
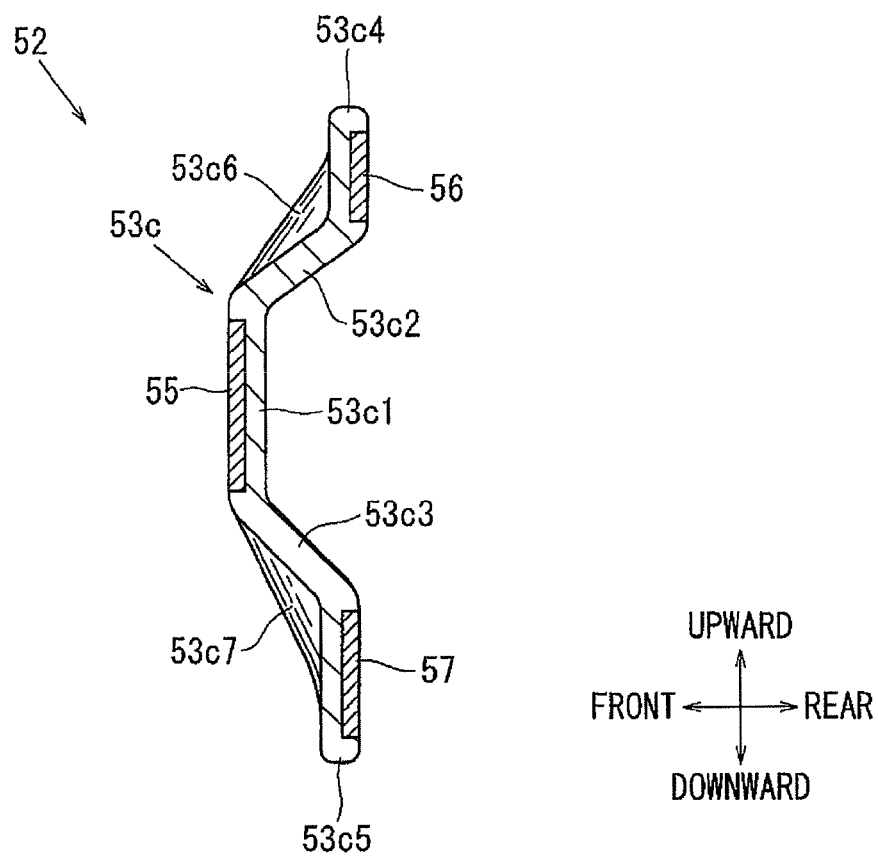
FIG. 10 is a cross-sectional view taken along line X-X in FIG. 6.

As shown in FIG. 10, the connecting portion 53c has a central portion 53c1, upper portion 53c4, lower portion 53c5 and connecting portions 53c2 and 53c3. The central portion 53c1 is aligned in the front-rear direction. A reinforcing member 55 is partially enclosed by a front area of the central portion 53c1. The upper portion 53c4 and the lower portion 53c5 are located rear of the central portion 53c1 and extend vertically. Reinforcing members 56 and 57 are partially enclosed by rear areas of the upper and the lower portions 53c4 and 53c5. The connecting portion 53c2 connects the central portion 53c1 and the upper portion 53c4. The connecting portion 53c3 connects the central portion 53c1 and the lower portion 53c5. The rib 53c6 connects the connecting portion 53c2 and the upper portion 53c4. The rib 53c7 connects the connecting portion 53c3 and the lower portion 53c5.

Figure 11:
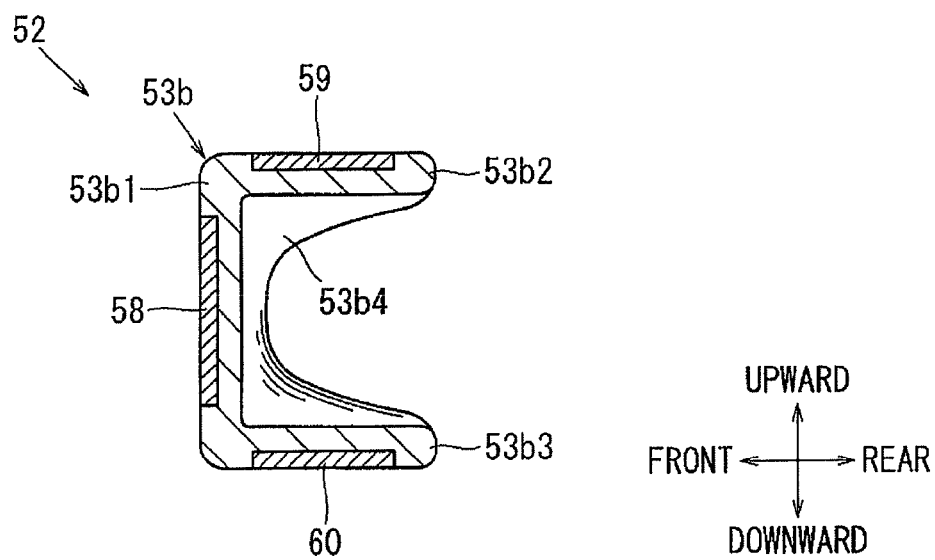
FIG. 11 is a cross-sectional view taken along line XI-XI in FIG. 6.
Figure 12:
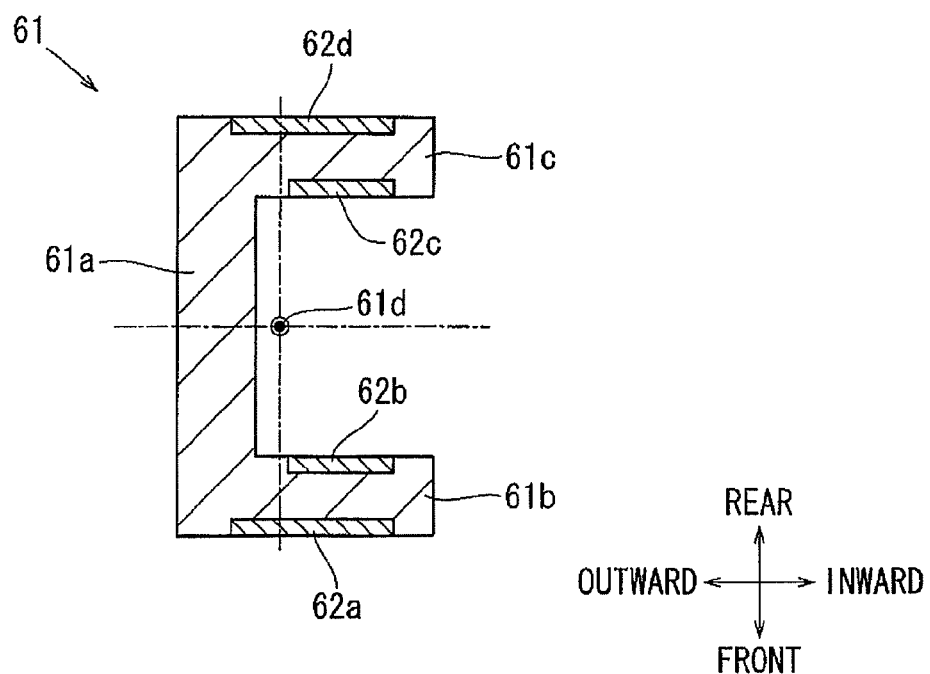
FIG. 12 is a cross-sectional view of a frame member according to another configuration.

As shown in FIG. 11, the connecting portion 53b has a central portion 53b1, an upper portion 53b2, lower portion 53b3, and a rib 53b4. The central portion 53b1 is aligned in the front-rear direction. A reinforcing member 58 is partially enclosed by a front area of the central portion 53b1. The upper portion 53b2 and the lower portion 53b3 extend rearward from ends of the central portion 53b1. A reinforcing member 59 is partially enclosed by an upper area of the upper portion 53b2. A reinforcing member 60 is partially enclosed by a lower area of the lower portion 53b3. The rib 53b4 extends in a vertical plane to connect the central portion 53b1, the upper portion 53b2 and the lower portion 53b3.

The frame member may have one of structures shown in FIGS. 12 to 15 instead of the structure shown in FIG. 3. The frame member shown in FIG. 12 comprises an elongated portion 61 extending vertically. The elongated portion 61 has a first portion 61a, a front second portion 61b and a rear second portion 61c. The first portion 61a extends in a front-rear direction to face in the width direction of the seat. The front and rear second portions 61b and 61c extend inward from ends of the first portion 61a. Reinforcing members 62a and 62b are provided in a front area (on a surface) and in a rear area (on a surface) of the first second portion 61b. Reinforcing members 62c and 62d are provided in a front area (on a surface) and in a rear area (on a surface) of the rear second portion 61c. A neutral axis 61d, which is a center of a cross-section of the elongated portion 61, is positioned between the front and rear second portions 61b and 61c. When a force is applied to the seat from front, momentum is preferably not applied on the neutral axis 61d.

Figure 13:
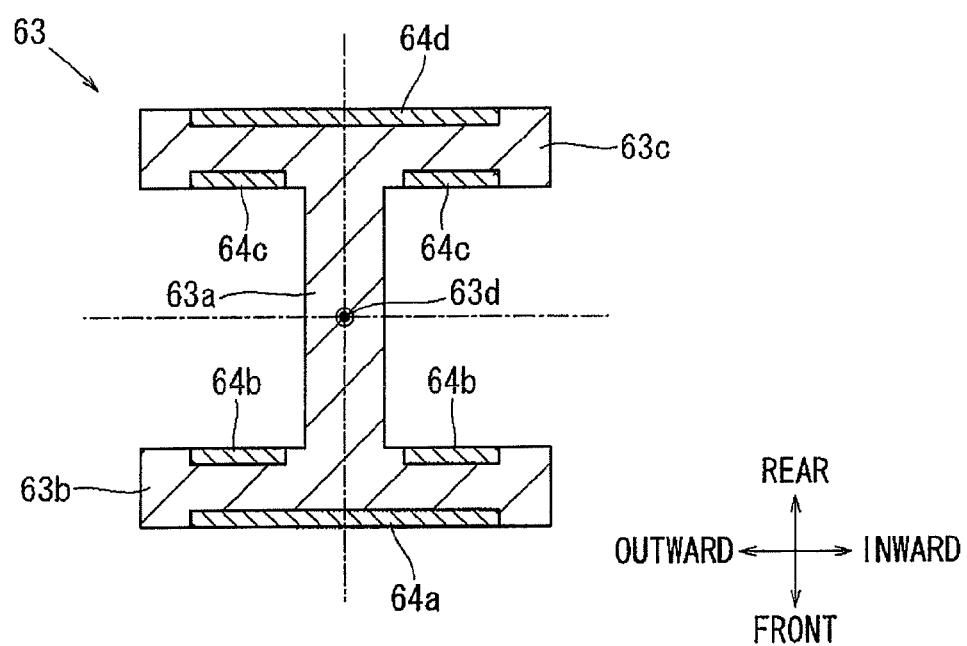
FIG. 13 is a cross-sectional view of a frame member according to another configuration.

The structure shown in FIG. 13 comprises an elongated portion 63. The elongated portion 63 has a first portion 63a, a front second portion 63b and a rear second portion 63c. The first portion 63a extends in the front-rear direction to face the width direction of the seat. The front and rear second portions 63b and 63c extend laterally (in the width direction of the seat) from ends of the first portion 63a. Reinforcing members 64a and 64b are provided in front and rear areas of the front second portion 63b. Reinforcing members 64c and 64d are provided in front and rear areas of the rear second portion 63c. A neutral axis 63d of the elongated portion 63 is positioned between the front and rear second portions 63b and 63c.

Figure 14:
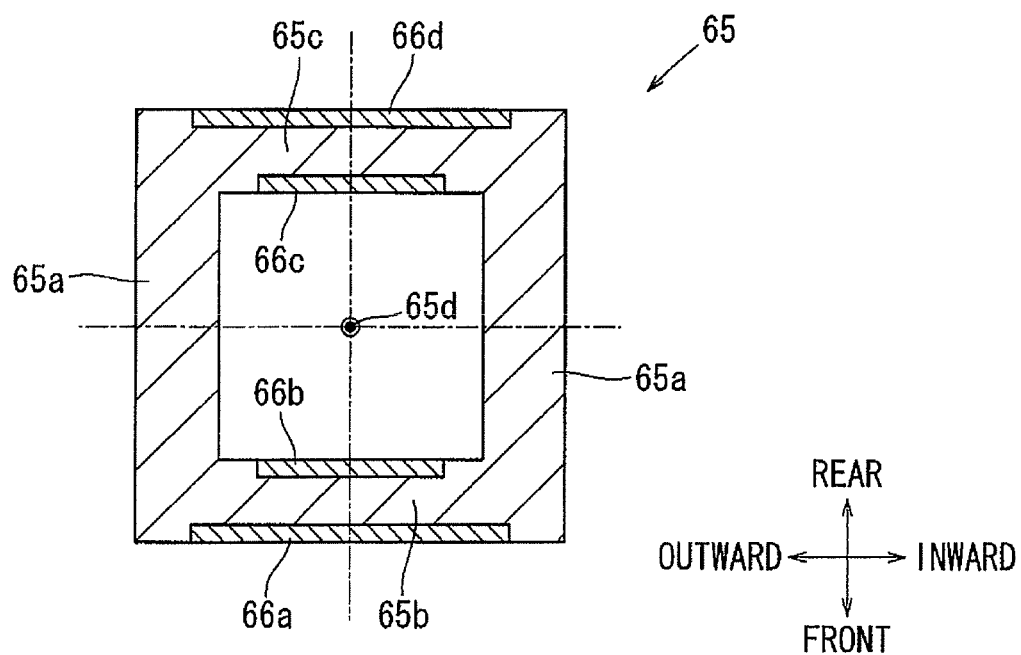
FIG. 14 is a cross-sectional view of a frame member according to another configuration.

The structure shown in FIG. 14 comprises an elongated portion 65. The elongated portion 65 has a pair of first portions 65a, a front second portion 65b and a rear second portion 65c. The first portions 65a extend in the front-rear direction to face the width direction of the seat. The front and rear second portions 65b and 65c extend in the seat width direction to connect ends of the pair of the first portions 65a. Reinforcing members 66a and 66b are provided in front and rear areas of the front second portion 65b. Reinforcing members 66c and 66d are provided in front and rear areas of the rear second portion 65c. A neutral axis 65d of the elongated portion 65 is positioned between the front and rear second portions 65b and 65c.

Figure 15:
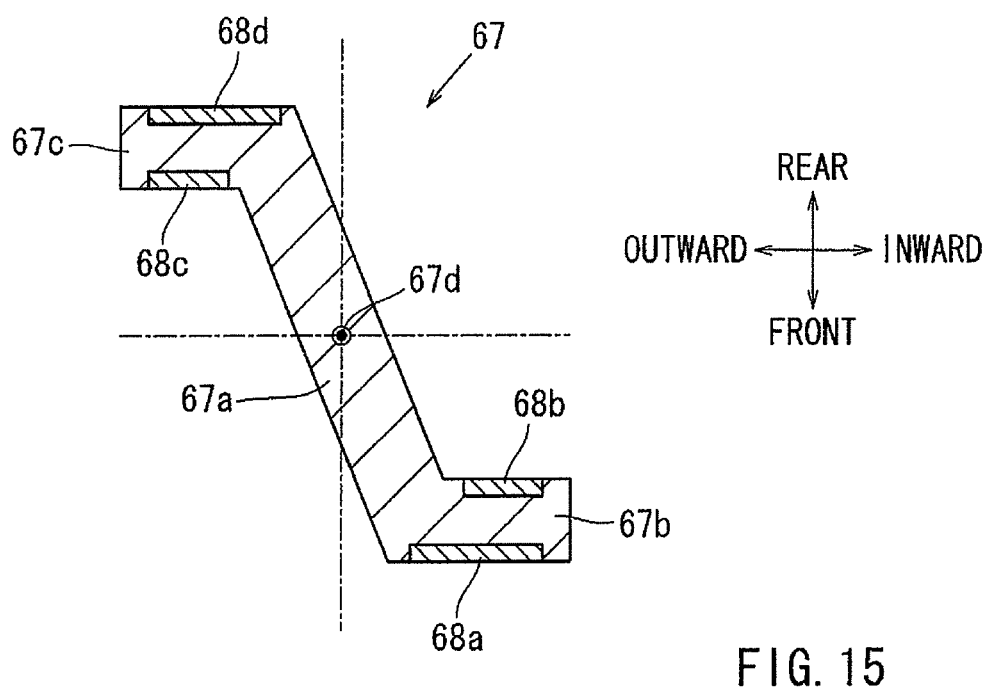
FIG. 15 is a cross-sectional view of a frame member according to another configuration.

The structure shown in FIG. 15 comprises an elongated portion 67. The elongated portion 67 has a first portion 67a, a front second portion 67b and a rear second portion 67c. The first portion 67a extends in the front-rear and seat width direction to face the width direction of the seat. The front second portion 67b extends inward from a front end of the first portion 67a. The rear second portion 67c extends outward from a rear end of the first portion 67a. Reinforcing members 68a and 68b are provided in front and rear areas of the front second portion 67b. Reinforcing members 68c and 68d are provided in front and rear areas of the rear second portion 67c. A neutral axis 67d of the elongated portion 67 is positioned between the front and rear second portions 67b and 67c.

As described above the vehicle seat comprises a frame member and a reinforcing member for reinforcing the frame member. The frame member has an elongated portion. The elongated portion is formed of resin and has a flat-plate-like or bar-like configuration. The elongated portion includes a first portion, a front second portion and a rear second portion. The first portion extends in the front-rear direction of the vehicle seat, and extends vertically. The front second portion extends laterally from the front end of the first portion. The rear second portion extends laterally from the rear end of the first portion. The elongated portion is configured so that the neutral axis is positioned between the front and rear second portions. The neutral axis preferably remains unaffected by tensile or compressive forces when a force is applied to the seat from the front. A reinforcing member is preferably not provided on the first portion. A reinforcing member is preferably provided only on the surfaces of the front and rear second portions. The reinforcing member includes a plurality of elongated fibers oriented in the longitudinal direction of the reinforcing member.

As described above the reinforcing member has the sides covered by the front or rear second portion in the width direction. It also has the front or rear face covered by the front or rear second portion. Thus, the front or rear second portion may support the reinforcing member in three directions. As a result, the reinforcing member may be prevented from falling off the front or rear second portion.

What is claimed is:

1. A vehicle seat comprising:
   a frame member having:
   an elongated portion being formed of resin, the elongated portion including:
      a first portion extending vertically and facing a lateral side of the vehicle seat;
      a front second portion extending laterally from a front end of the first portion; and
      a rear second portion extending laterally from a rear end of the first portion,
      the elongated portion being configured so that a neutral axis is positioned between the front and rear second portions; and
   a reinforcing member which is not provided on the first portion but rather provided on a surface of at least one of the front second portion and the rear second portion, the reinforcing member having:
      a plurality of elongated fibers oriented in a longitudinal direction of the elongated portion.

2. The vehicle seat of claim 1, wherein
at least one of the front second portion and the rear second portion has a width gradually changing in size in the longitudinal direction of the elongated portion, and wherein
the reinforcing member has a width gradually changing in size in correspondence with the width of the at least one of the front second portion and the rear second portion.

3. The vehicle seat of claim 1, wherein
the reinforcing member has sides covered by the at least one of the front second portion and the rear second portion in a width direction of the vehicle seat, and at least one of a front face covered by the front second portion and a rear face covered by the rear second portion.

4. The vehicle seat of claim 1, wherein
the rear second portion has a front face and a rear face, and
the reinforcing member is provided on the rear face of the rear second portion.

5. The vehicle seat of claim 1, wherein
the front second portion has a front face and a rear face, and
the reinforcing member is provided on the front face and the rear face of the front second portion.

6. The vehicle seat of claim 1, wherein
the rear second portion has a front face and a rear face, and the reinforcing member is provided on the front face and the rear face of the rear second portion.

7. The vehicle seat of claim 1, wherein
the front second portion extends in a first lateral direction from the front end of the first portion, and
the rear second portion extends in the same first lateral direction from the rear end of the first portion.

8. The vehicle seat of claim 1, wherein
the front second portion extends in a first lateral direction from the front end of the first portion, and
the rear second portion extends in a second lateral direction opposite to the first lateral position from the rear end of the first portion.

9. The vehicle seat of claim 1, wherein
the front second portion extends in both lateral directions from the front end of the first portion.

10. The vehicle seat of claim 1, wherein
the rear second portion extends in both lateral directions from the rear end of the first portion.

11. The vehicle seat of claim 1, wherein
the front second portion has a front face and a rear face, and
the reinforcing member is provided on the front face of the front second portion.

12. The vehicle seat of claim 1, wherein
the reinforcing member has sides covered by at least one of the front second portion and the rear second portion in a width direction of the vehicle seat.

13. The vehicle seat of claim 12, wherein
the reinforcing member has a rear face covered by the front second portion from a rear side thereof.

14. The vehicle seat of claim 12, wherein
the reinforcing member has a front face covered by the rear second portion from a front side thereof.

15. A frame member for a vehicle seat comprising:
an elongated portion being formed of resin, the elongated portion including:
  a first portion that extends vertically and is configured to face a lateral side of the vehicle seat;
  a front second portion extending laterally from at least one of a front end and a rear end of the first portion; and
a reinforcing member which is not provided on the first portion but rather provided on a surface of the second portion, the reinforcing member having:
  a plurality of elongated fibers oriented in a longitudinal direction of the elongated portion.

16. The frame member of claim 15, wherein
the second portion has a width gradually changing in size in the longitudinal direction of the elongated portion, and
the reinforcing member has a width gradually changing in size in correspondence with a width of the second portion.

17. A frame member for a vehicle seat comprising:
an elongated portion being formed of resin, the elongated portion including:
  a first portion that extends vertically and is configured to face a lateral side of the vehicle seat;
  a front second portion extending laterally from a front end of the first portion; and
  a rear second portion extending laterally from a rear end of the first portion; and
a reinforcing member which is not provided on the first portion but rather provided on a surface of at least one of the front second portion and the rear second portion, the reinforcing member having:
  a plurality of elongated fibers oriented in a longitudinal direction of the elongated portion.

18. The frame member of claim 17, wherein
at least one of the front second portion and the rear second portion has a width gradually changing in size in the longitudinal direction of the elongated portion, and
the reinforcing member has a width gradually changing in size in correspondence with a width of at least one of the front second portion and the rear second portion.

\* \* \* \* \*